E. A. COVELL.
LANDING NET.
APPLICATION FILED MAR. 6, 1909.
985,114.
Patented Feb. 21, 1911.
3 SHEETS—SHEET 1.
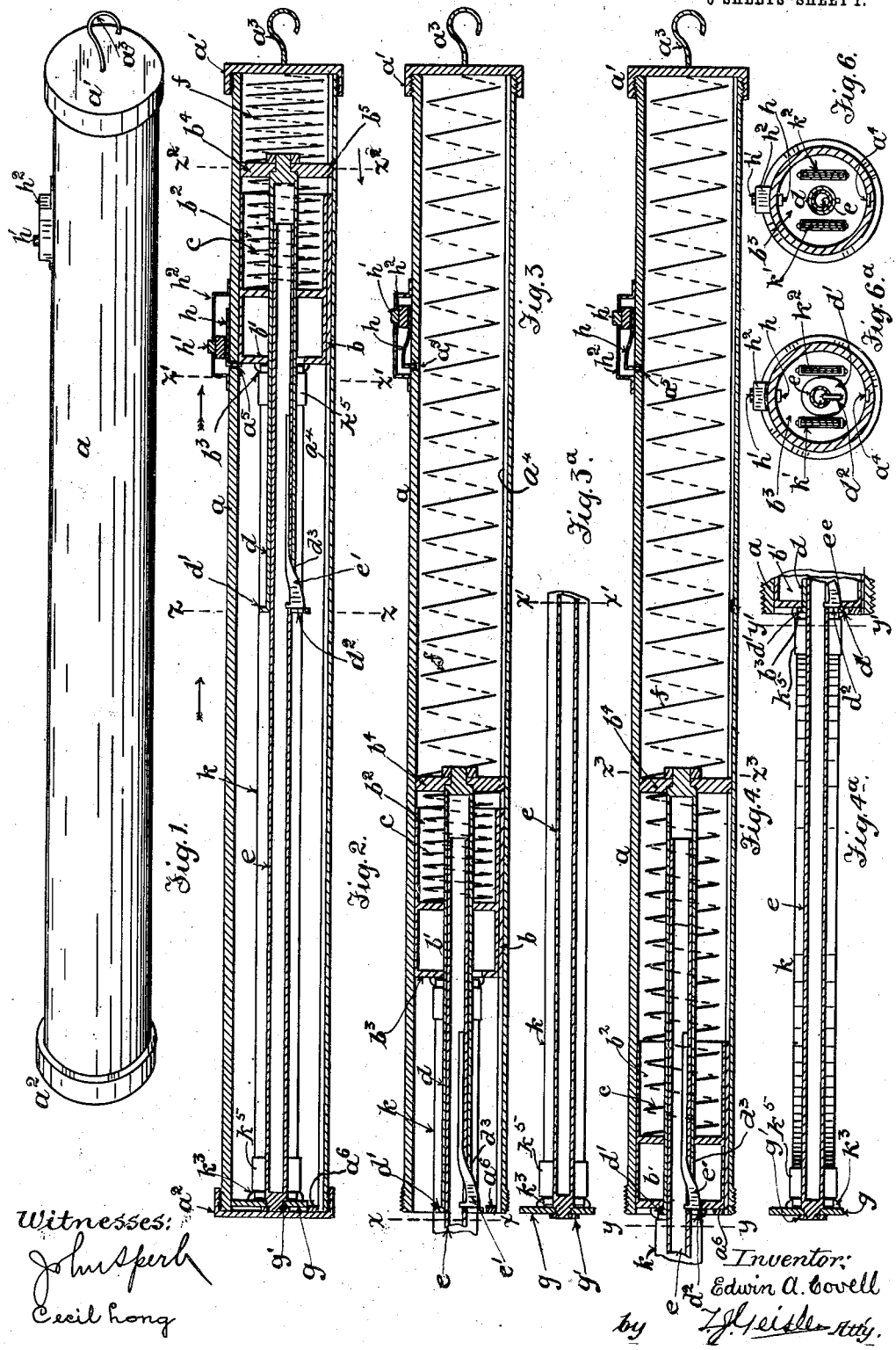
Witnesses:
Inventor:
Edwin A. Covell E. A. COVELL.
LANDING NET.
APPLICATION FILED MAR. 6, 1909.
985,114.
Patented Feb. 21, 1911.
3 SHEETS—SHEET 2.
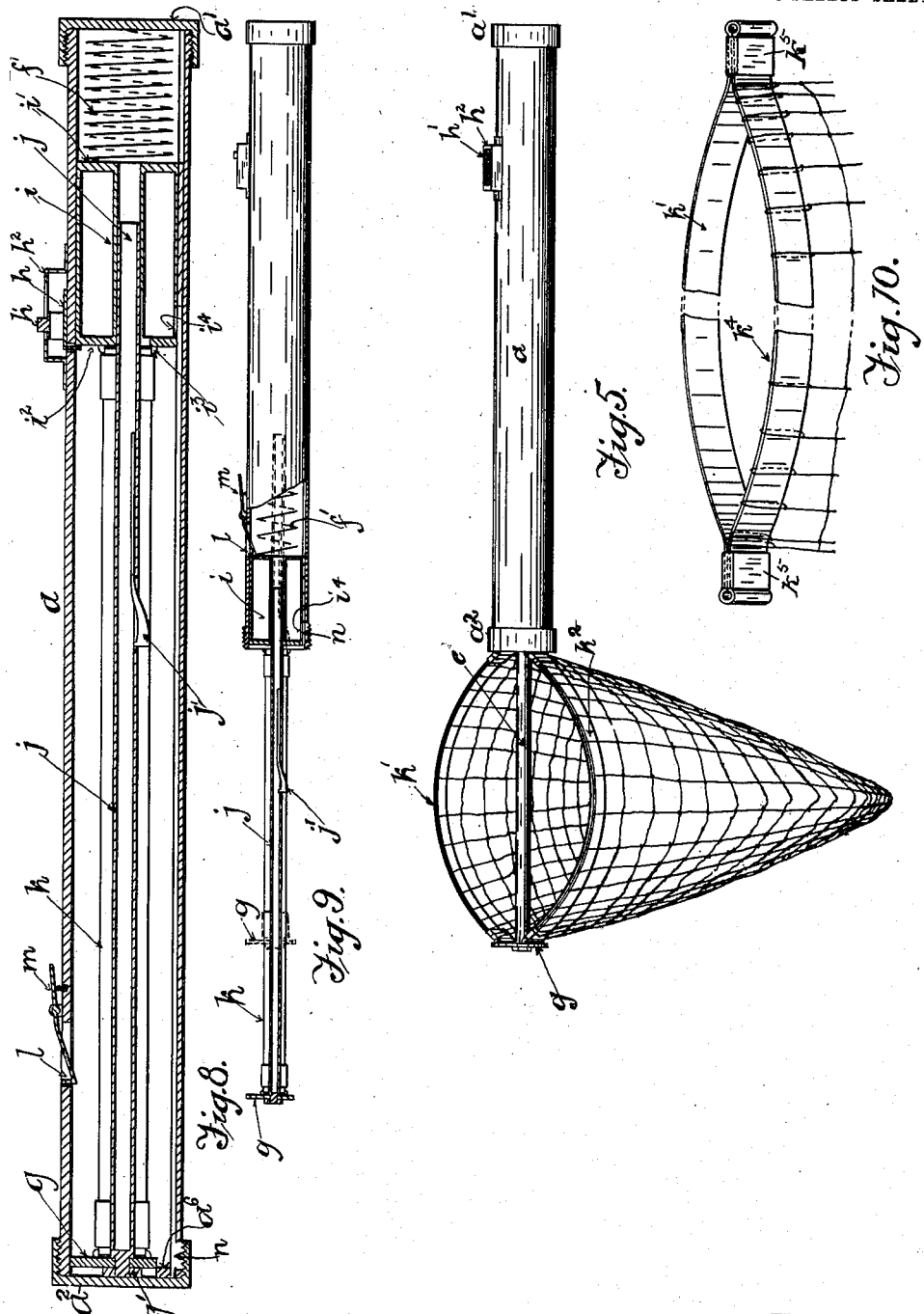

E. A. COVELL.
LANDING NET.
APPLICATION FILED MAR. 6, 1909.
985,114.
Patented Feb. 21, 1911.
3 SHEETS—SHEET 3.
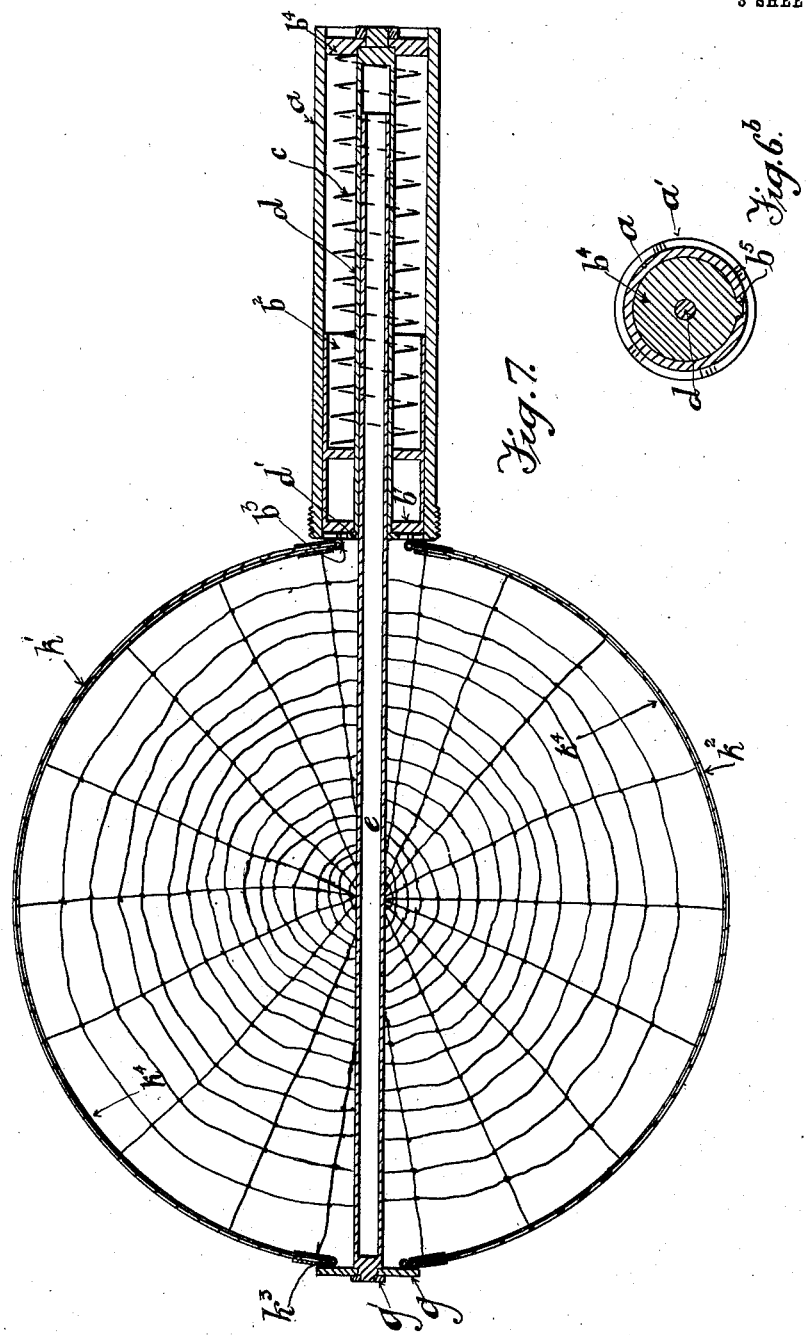
Witnesses:
John Aperh
Cecil Long
Inventor:
Edwin A. Covell
by F. J. Geisler
Atty.

UNITED STATES PATENT OFFICE.

EDWIN A. COVELL, OF PORTLAND, OREGON.

LANDING-NET.

985,114.  Specification of Letters Patent.  Patented Feb. 21, 1911.

Application filed March 6, 1909. Serial No. 481,846.

*To all whom it may concern:*

Be it known that I, EDWIN A. COVELL, a citizen of the United States, and a resident of Portland, in the county of Multnomah and State of Oregon, have invented a new and useful Improvement in Landing-Nets, of which the following is a specification.

This invention relates to the art of fishing with pole and line, and has for its object to obtain a landing net which, when not in use, can be put together in a very small, compact form, so as to be conveniently carried about.

To this end my invention comprises a hollow handle, a collapsible net-frame and a net attached thereto, a plunger reciprocating in the hollow of the handle, to which plunger the net-frame is fastened, said net-frame being adapted to be entirely telescoped into said handle, and the latter constituting its case, so that when my net is carried about the same will be concealed in its handle; a spring element arranged, when released, to project said net-frame out of the handle; means to restrain the spring element when the net-frame is slid into the hollow-handle; and means to hold the net-frame in its expanded state when projected, so as to open the net. I have also provided in one type of my device, means to automatically place and hold the net-frame in its expanded state, upon the net-frame being projected from the handle.

The general details of construction of my device, and the mode of its operation is illustrated in the accompanying drawings, in which:

Figure 1 is a perspective view of my device arranged for carrying about; Fig. 2 is a central, longitudinal, vertical section of my device, arranged as shown in the preceding figure; Figs. 3, 3$^a$, taken together and arranged on the section lines $x$—$x$, $x'$—$x'$, show a longitudinal, vertical section of my device with the operating parts in the first stage of projecting the net-frame; Figs. 4, 4$^a$, taken together and arranged on the section lines $y$—$y$, $y'$—$y'$, show a similar vertical section of my device, with the operating parts in their position when the projection of the net-frame has been accomplished; Fig. 5 is a perspective view, on a smaller scale, of my landing net with the net-frame thereof projected and expanded, and the net opened ready for use; Fig. 6 is a cross-section, taken on a line $z$—$z$ of Fig. 2, looking in the direction pointed by the arrow; Fig. 6$^a$ is a similar cross-section on line $z'$—$z'$ of Fig. 2; Fig. 6$^b$ is a cross-section of Fig. 2 on a line $z^2$—$z^2$; Fig. 7 is a plan section of my device, taken to the left of line $z^3$—$z^3$ of Fig. 4, and showing the operating parts in the same stage as shown in Figs. 4 and 4$^a$, that is to say, the net-frame being fully projected and expanded ready for use; Fig. 8 is a longitudinal, vertical section of my device, so modified that one of the spring elements shown in the preceding figures is eliminated, and in consequence of which the expanding of the net, instead of being automatically accomplished, as done by the arrangement of the parts in the preceding figures, has to be done by hand; Fig. 9 is a like section as the preceding figure, showing part of the case in full, and also showing the net as projected; this figure being drawn on a smaller scale than the preceding view; and Fig. 10 is a detail representing one of the two members of the net-frame and illustrating the making of the net-frame members of inner and outer bands, to the inner of which the top of the net is fastened, and the outer band-member covering the net strands and protecting them against undue wear, during the movement of the net-frame into and out of the hollow of the handle; the inner and outer members of the net-frame, of course, lie side by side, but in the illustration they are shown as abnormally parted so as to render the construction described more readily discernible.

The letters designate the parts described.

As already mentioned, the accompanying drawings show the two types of my invention. In one type, my device is provided with means arranged to automatically place and hold the net-frame in its expanded state upon the net-frame being projected from the handle; and in the other type, such automatic means are omitted and the user of my landing net is, in consequence, obliged to open the net-frame after the same has been projected from the handle, by placing the end of the net-frame against some fixed object.

I will describe, in the first instance, that type of my landing net in which are provided the automatic means for opening the landing net when projected. The same consists of a cylinder, $a$, made of any suitable material, and provided at its ends with exterior threads on which to receive caps $a'$, $a^2$.

The hollow handle of my device constitutes a case adapted to contain all the working parts, as well as the net-frame and net, when my device is closed, so as to render the same convenient to be carried about and likewise to protect the net.

The cap $a'$ has rigidly affixed to it a hook $a^3$, as a convenient means for suspending the device from a belt, or other apparel of the person.

Within the hollow handle $a$ reciprocates the plunger $b'$. To guide the latter, and prevent its rotation, the interior of the handle $a$ is provided with a longitudinal groove $a^4$, and the plunger is made with a corresponding rib $b$ which slides in said groove $a^4$.

The plunger $b'$ is preferably made hollow, as shown in the drawings, so as to reduce weight, and, furthermore, to provide a chamber $b^2$ for the coil-spring $c$. The plunger $b'$ is longitudinally slidable upon a cylindrical tube or sleeve $d$, rigidly fastened to a piston or disk $b^4$, against which bears a coil-spring $f$, the right end of which bears against the cap $a'$. The piston $b^4$ is also made with a rib $b^5$, sliding in the groove $a^4$ of the handle, to restrain the piston against rotation. The cap $a'$ is removable for convenience of repair, for by removing the same all the parts may be withdrawn from the hollow handle, as obvious.

To the exterior of the head of the plunger $b'$ are hinged, at $b^3$, the inner ends of the two members ($k'$, $k^2$) of my expansible net-frame $k$. The left ends $k^3$ of the frame-members are hinged to a circular cross-head $g$, which is affixed to the left end of a tubular rod $e$ by a nut $g'$; and said rod $e$ is adapted to slide in the sleeve $d$. But normally the tubular rod $e$ is locked with the sleeve $d$ by the keeper $e'$ fastened on the interior of the rod $e$, projecting through registering slots $d^3$ of the sleeve and rod $e$, and engaging with the flange $d'$ on the sleeve $d$, so that the latter in its outward movement by spring $f$ will carry with it the rod $e$. The members $k'$, $k^2$ of the net-frame are made of resilient material so as to be adapted to expand and thus open the net, as hereinafter described. Such expansion is accomplished by the following construction: The sleeve $d$ and rod $e$ constitute a connection between the plunger $b'$, to which one end of the two membered net-frame is hinged, and the cross-head $g$, to which the outer end of the net-frame is hinged. Thus the sliding movement of the plunger $b'$ on the sleeve $d$, caused by the springs $c$, $f$, from its position in Fig. 2 to its position in Fig. 4 will cause a relative shortening of said connection between the extremities of the net-frame members, and cause the latter to expand or open out, as it were, as shown in Figs. 5 and 7, thereby placing my device in its ready-for-use-state. The hollow handle, $a$, is made with an aperture $a^5$, through which is projected the downwardly bent head of a spring latch $h$, so that when the net-frame has been slid into the hollow of the handle $a$, as shown in Fig. 2, said latch-head may be caused to engage with and restrain the plunger $b'$ against the impulse of the springs $c$ and $f$. The latch $h$ is operated by moving the sliding button $h'$, contained in the slotted case $h^2$.

Supposing the parts to be arranged as shown in Fig. 2, the cap $a^2$ removed, and the button $h'$ moved to the right, so as to permit the head of the latch $h$ to release the plunger $b'$, the coil-spring $f$ will act to project the piston $b^4$ and cause the parts to assume, approximately, the position thereof illustrated in Fig. 3. It will be noted that the spring $f$ has moved the plunger $b'$ only part of its distance outward, in the hollow of the handle, and that in consequence the members $k'$, $k^2$ of the net-frame being still partly within the handle are still restrained against expanding to the full extent. The spring $c$ however acts to project the plunger $b'$ to the mouth of the hollow handle, $a$, against a stop $a^6$, thereby projecting the net-frame completely out of the handle, and relatively shortening the length of the rod between the head of the plunger $b'$ and the cross-head $g$, causing the members $k'$, $k^2$ of the net-frame to expand or open out, as it were, as shown in Figs. 5 and 7, and thereby placing my net in its state for use. The springs $c$, $f$, of course, act together.

In order to save the net from being worn at the ends where attached to my net-frame I preferred to make each of the net-frame members of inner and outer bands, or, in other words, to provide each of the net-frame members with an inner band $k^4$, the ends of which are attached to the ends of the main-net members $k'$ and $k^2$, respectively, by the hinge pieces $k^5$; the outer, or main members, $k'$ and $k^2$, encompassing said inner members of the net-frame, and thus protecting the net strands from wear, while the net is being moved into and out of the hollow of the handle.

When the net is to be returned in the handle the keeper $e'$ is pressed in to disengage the sleeve from the rod $e$, which will then be moved outward by the reflex action of the net-frame members $k'$, $k^2$ straightening themselves. This is required to replace the net frame in the handle. After the net-frame members have been straightened out the net is twirled together into elongated form and laid between the net-frame members. Next the net frame is pushed back into the handle, in doing which the keeper $e'$ will pass through the slot of the flange $d^2$ of the sleeve $d$, and then drop behind such flange, thus reconnecting the sleeve $d$ and rod $e$. The parts are pushed in until the cross-head $g$ of the net frame is within the handle; then the plunger $b'$ is locked by the latch $h$, and finally the cap $a^2$ is replaced.

In the modified type of my landing net, shown in Figs. 8 and 9, the details of the description above given apply, except in the following particulars: The plunger $b'$ is replaced by a plunger $i$, slidably mounted on a tubular rod $j$. The piston $b^4$, in the prior construction, is omitted, and the coil-spring $f'$ bears against the right end $i'$ of the plunger $i$. The net-frame $k$ is attached to the head $i^2$ of the plunger $i$ in the same manner as before described, and the opposite end of the net-frame is attached to a cross-head $g$, secured in place by a nut $g'$. There is no secondary coil-spring as $c$, shown in the first described type of my invention, and the handle, $a$, is provided with an aperture $l$, in which operates a spring-controlled keeper $m$, so contrived as to allow the plunger $i$ to pass to the left and then engage and hold the same against return movement until the keeper $m$ is operated to release the plunger.

When my landing net is constructed as last above described, the operation thereof is substantially as follows: Upon the button $h'$ being moved to release the latch $h$, the spring $f'$ will project the plunger $i$ to the mouth of the handle, causing the head $i^2$ of the plunger $i$ to strike the stop $a^6$, and the plunger being locked in place by the dropping of the keeper $m$ behind it. The net-frame $k$ will thus be projected from the end of the handle $a$, but not expanded. In order to expand the net, it is necessary that the outer end of the net-frame be pressed against some fixed object, causing the tubular rod $j$ to telescope into the plunger $i$, until the keeper $j'$ enters the aperture $i^3$ and locks with the head or wall $i^2$ of the plunger, thereby shortening the connection between the two ends of the net frame, expanding the net-frame members $k'$, $k^2$ and opening the net. When desiring to return the net-frame into the handle, some instrument is inserted through the aperture $n$, therefor provided in the handle $a$, and through the aperture $i^4$ provided in the plunger $i$, so as to depress the keeper $j'$, allow the rod $j$ to re-assume its normal position, causing the frame-members to be collapsed, and straightened out ready for moving back into the handle.

The details of construction described, of course, may be varied as deemed expedient.

I claim—

1. A landing net comprising a hollow handle, a piston reciprocable in the handle, a sleeve affixed to the piston, a plunger slidable on the sleeve, a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, a net secured on the net-frame, a stop within the hollow of the handle to limit the movement of the plunger when projected, a latch to arrest the movement of the plunger until released, a keeper to temporarily lock the telescoping rod with the sleeve, and the parts being arranged to entirely conceal the net in the handle when the net has not been projected.

2. A landing net comprising a hollow handle, a piston reciprocable in the handle, a sleeve affixed to the piston, a plunger slidable on the sleeve, a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, each of said net-frame members comprising an outer and an inner band, a net secured on the inner band of the net-frame, and the outer band of the net-frame covering said inner band and protecting the net against wear during the movement of the same into and out of the hollow handle, a stop within the hollow of the handle to limit the movement of the plunger when projected, a latch to arrest the movement of the plunger until released, a keeper to temporarily lock the telescoping rod with the sleeve, and the parts being arranged to entirely conceal the net in the handle when the net has not been projected.

3. A landing net comprising a hollow handle, a piston reciprocable in the handle, a sleeve affixed to the piston, a plunger slidable on the sleeve, a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, a net secured on the net-frame, a stop within the hollow of the handle to limit the movement of the plunger when projected, a latch to arrest the movement of the plunger until released, a keeper to temporarily lock the telescoping rod with the sleeve, means arranged to place and hold the net-frame in its expanded state upon the net-frame being projected from the handle, and the parts being arranged to entirely conceal the net in the handle when the net has not been projected.

4. A landing net comprising a hollow handle, a piston reciprocable in the handle, a sleeve affixed to the piston, a plunger slidable on the sleeve, a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, each of said net-frame members comprising an outer and an inner band, a net secured on the inner band of the net-frame, and the outer band of the net-frame covering said inner band and protecting the net against wear during the movement of the same into and out of the hollow handle, a stop within the hollow of the handle to limit the movement of the plunger when projected, a latch to arrest the movement of the plunger until released, a keeper to temporarily lock the telescoping rod with the sleeve, means arranged to place and hold the net-frame in its expanded state upon the net-frame being projected from the handle, and the parts being arranged to entirely conceal the net in the handle when the net has not been projected.

5. A landing net comprising a hollow handle, a piston reciprocable in the handle, a sleeve affixed to the piston a plunger slidable on the sleeve a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought near together, a net secured on the net-frame, a stop within the hollow of the handle to limit the movement of the plunger when projected, a keeper to temporarily lock the telescoping rod with the sleeve, means to hold the net frame in its expanded state, and the parts being arranged to entirely conceal the net in the handle when the net has not been projected.

6. A landing net comprising a hollow handle, a piston reciprocable in the handle, a sleeve affixed to the piston, a plunger slidable on the sleeve, a rod telescoping in the sleeve, a spring arranged to project the piston, and a secondary spring arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, each of said net-frame members comprising an outer and an inner band, a net secured on the inner band of the net-frame, and the outer band of the net-frame covering said inner band and protecting the net against wear during the movement of the same into and out of the hollow handle, a stop within the hollow of the handle to limit the movement of the plunger when projected, a keeper to temporarily lock the telescoping rod with the sleeve, means to hold the net frame in its expanded state, and the parts being arranged to entirely conceal the net in the handle when the net has not been projected.

7. A landing net comprising a hollow handle, a plunger reciprocable in the handle, a rod reciprocable in the plunger, a spring element arranged to project the plunger, a collapsible two-membered net-frame made of resilient material, said frame being attached at one end to the plunger and at the opposite end to the extremity of the telescoping rod, and said frame-members being adapted to expand outward when the ends of the frame are brought nearer together, a net secured on the net-frame, a stop within the hollow of the handle to limit the movement of the plunger when projected, a latch to arrest the movement of the plunger until released, a keeper to temporarily lock the telescoping rod with the plunger, and the parts being arranged to entirely conceal the net in the handle when the net has not been projected.

EDWIN A. COVELL.

Witnesses:
 RALPH R. DUNIWAY,
 CECIL LONG.